March 27, 1962  L. R. MILLER ET AL  3,026,749
DRILL GUIDE BUSHING
Filed Jan. 27, 1958

LEON R. MILLER
CLYDE M. TAYLOR
INVENTORS

HERZIG AND JESSUP
ATTORNEYS

BY Warren T. Jessup

3,026,749
DRILL GUIDE BUSHING

Leon R. Miller, Los Angeles, and Clyde M. Taylor, Maywood, Calif., assignors to Rezolin Incorporated, Santa Monica, Calif., a corporation of California
Filed Jan. 27, 1958, Ser. No. 711,294
6 Claims. (Cl. 77—62)

This invention relates to drill guide bushings and more particularly to drill guide bushings adapted to be mounted in relatively light weight non-metallic drilling templates or fixtures, and has for its object the provision of a drill guide bushing having a drill guide member embedded within a body part adapted to be mounted in said template or fixture which body part is comprised of material, either metallic or non-metallic, or admixtures thereof, having a selected rate of heat conductivity and a mass and heat radiating and storage properties effective to maintain a temperature in the mass, under the normal drilling conditions for which the drill guide is designed, which is substantially below the thermal decomposition temperature of the material comprising the mass and a temperature about the outer periphery thereof which is substantially below the thermal decomposition temperature of the cementing or potting compound utilized in securing the bushing in position in the template.

A further object is to provide an improved drill guide bushing for drilling templates and fixtures.

Still another object is to provide an improved method and means for mounting drill guides in light weight non-metallic drilling templates and fixtures.

Another object will be apparent as the invention is more fully hereinafter disclosed.

In accordance with these and other objects we have devised an improved method and means for mounting drill guides in light weight non-metallic drilling templates and fixtures in which the detrimental effects of heat generated by the drill in the drill guide on the non-metallic material utilized in mounting the drill guide in the template fixtures are substantially completely eliminated, with resultant marked increase in the life expectancy of the drill guide and template during service use. This improved result is obtained by first mounting the drill guide in a bushing comprised of a body of material having a rate of thermal conductivity selected to transmit the heat energy generated in the drill guide relatively rapidly to the interior of the bushing and having a mass and heat radiating and storage properties selected to provide, under the expected drilling conditions for which the drill guide bushing is designed, an internal temperature, particularly in the area adjacent the drill guide, which is substantially below the thermal decomposition temperature of the material comprising the bushing and a peripheral temperature substantially below the thermal decomposition temperature of the cementing or potting composition utilized in securing the bushing in the template.

Before further disclosure of the invention reference should be made to the accompanying drawings wherein:

FIG. 5b is a sectional view of the same along plane 5b—5b of FIG. 5a;

FIG. 6b is a sectional view of the same along plane 6a—6a;

FIG. 7b is a sectional view of the same along plane 7a—7a; and

In the art of drilling materials to provide therein holes located at precise points, particularly in the mass production of articles of manufacture comprised of a plurality of parts adapted by such drill holes to be secured together to form a unitary body, it is essential that each drilled part be interchangeable with a like drilled part in the assembly of such parts. To insure this it is customary practice to provide a drilling template or fixture adapted to be seated upon the part in a precise position thereon in which template or fixture is mounted in precise position a drill guide through which the drill is passed in drilling the hole in the part.

It is also customary to comprise the drilling template or fixture of some light weight non-metallic material, such as a laminated synthetic resin product. A wide plurality of synthetic resins, otherwise known in the art as plastic compounds, both cold setting and thermo-setting, have been heretofore employed in comprising the template and a large number of fibrous and woven fibrous materials have been utilized in forming the laminated plastic template body. Insofar as the present invention is concerned, the specific type, kind, or composition of the drilling template is immaterial to the invention and, per se, forms no part of the invention, except insofar as it is necessary and essential to the full utility of the invention and insofar as such material comprising the template imposes a determined temperature limitation to be met by the present invention.

Figure 1:
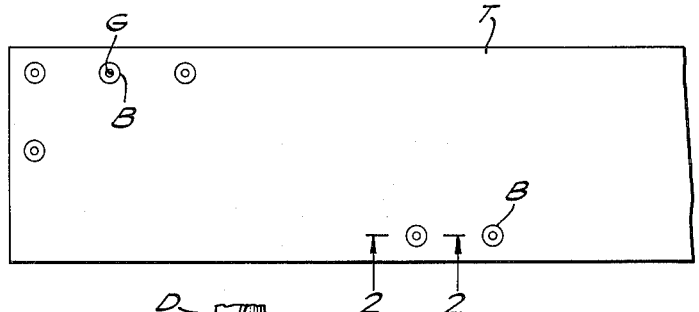
FIG. 1 is a top view of a drilling template or fixture as improved in accordance with the present invention.
Figure 3:
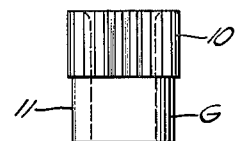
FIG. 3 is an enlarged side elevational view of a typical form of drill guide utilized in the art and adapted for improvement in accordance with the present invention.
Figure 2:
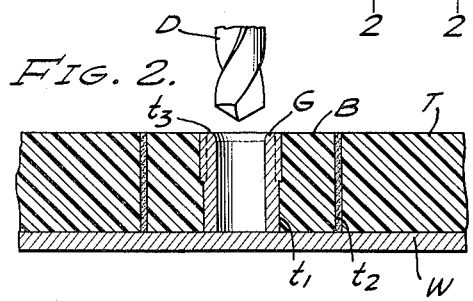
FIG. 2 is an enlarged sectional view taken along plane 2—2 of FIG. 1.
Figure 4:
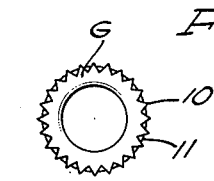
FIG. 4 is a top view of the same.
Figure 5A:
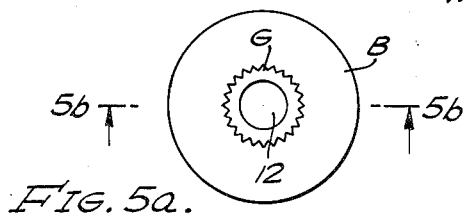
FIG. 5a is a top view of the improved drill guide bushing of the present invention in one specific embodiment thereof.
Figure 5B:
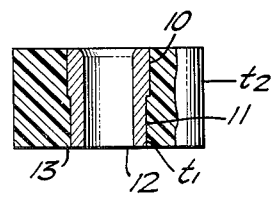

Accordingly, referring to FIGS. 1, 2, and 3; in FIG. 1 is shown a template or fixture T which may be of any other size, shape, or configuration than that shown without departure from the invention, within which template T is mounted a drill guide G in the precise position therein to locate a drill hole in predetermined position in an underlying work piece W (FIG. 2). A plurality of such drill guides G are indicated as being mounted in the template T. Drill guides G may be of a plurality of different sizes, shapes and configurations without departure from the invention and may be comprised of any suitable metallic composition without departure from the invention.

In accordance with the present invention the drill guide G is first secured in a bushing B and the drill guide and bushing (G—B) is mounted as a unitary product in the template T.

In normal practice, the drill guide G is mounted in the template T by drilling therein an opening which is slightly larger than the outside diameter of the drill guide G and securing the drill guide G in centered position in this opening by a cementing or potting composition that will adhere to the material comprising the template and to the exterior surface of the drill guide sufficiently to inhibit rotational and axial movement of the drill guide in the template T. To facilitate this practice, the exterior surface of the drill guide is usually provided with a knurled area 10 which in this specific type of drill guide is of slightly greater diameter than the remaining area 11 (FIG. 3) so that when the drill guide G is secured in position in the opening in the template T, the knurled area 10 will secure the drill guide therein against axial movement rotatively or longitudinally along its axis.

However, when the drill bit D (FIG. 2) is inserted in the drill guide G, thus mounted in the template T, and is rotated therein to drill work piece W, the heat energy generated and conducted to the inner side wall of the drill guide G is passed directly into the template T. The usual thermal decomposition temperature of the plastic composition employed in the forming of the template T approximately 200° F. It is relatively easy to heat the drill guide G to a temperature above this thermal decomposition temperature even in normal light drilling operations with resultant loosening of the drill guide in the template T.

The loosening of the drill guide G in the template T is inhibited by the practice of the present invention by embedding the drill guide G in any convenient manner as by casting, molding, or press-fitting the same therein, in a bushing B comprised of material having a higher thermal decomposition temperature than the material of the template T or the cementing or potting composition to be utilized in securing the bushing B in the template T and a rate of thermal conductivity selected with respect to the heat generated in the drill guide G, under normal service drilling conditions for which the bushing is designed, to conduct the heat energy relatively rapidly from the exterior surface of the drill guide G to the interior of the bushing B and having a mass and heat radiating properties selected to provide for maintaining a temperature in the bushing B and particularly in the area next adjacent the drill guide G that is substantially below the thermal decomposition of the material comprising the bushing B and a peripheral temperature of the bushing B that is substantially below the thermal decomposition temperature of the material comprising the template T or the cementing or potting composition employed in securing the bushing B in the template T.

Within this broad concept of the present invention there are many materials suitable for use in the forming of the bushing B. A wide plurality of metallic and nonmetallic compositions and mixture thereof, ranging from thermal insulators such as refractories and synthetic resins and combinations thereof on the one hand to thermal conductors such as metallic compositions and alloys, sintered metals and cast alloys, on the other hand, are available in the art from which may be selected one, or a plurality of materials, suitable for use under any given set of drilling conditions such as: heavy, light, or medium drilling; extended and intermittent drilling operations, etc.

As one specific embodiment of the invention but not as limitation thereof, the invention will be described as it has been adapted for utility in the drilling of sheet metal, particularly sheet metal of the aluminum class utilized in the fabrication of aircraft. In this type of drilling, the sheet metal is cut to size, shape and configuration to be mounted in position in the aircraft. The sheet metal is then mounted in a jig, the template T is placed thereover, and the plurality of rivet or bolt holes needed for mounting the sheet in the aircraft are drilled therein, either singly or simultaneously, by passing drills through the plurality of drill guides, precisely located in the template T.

Under these drilling conditions, the amount of heat generated in the drill guide in each drilling operation is comparatively low as compared to other types of drilling operations but in mass production operations, the frequency of drilling operations is such that each drill guide frequently heats up to a temperature in excess of the thermal decomposition temperature of the cementing composition employed in securing the drill guide in position of the template.

In this specific embodiment the template T is comprised of a laminated plastic structure consisting of a plurality of layers of glass fiber fabric, bonded together with a plastic composition known in the art as epoxy compounds; the specific type of epoxy compounds utilized in the forming of this laminated structure is immaterial to the present invention. The thermal decomposition temperature of these epoxy compounds vary somewhat but, in general, those utilized in the forming of this type of laminated structure have a thermal decomposition temperature at least approximating 200° F. The precise thermal decomposition temperature of the epoxy compounds utilized sets the maximum temperature for the periphery of the bushing B of the present invention.

The usual thickness of such a laminated template approximates one-half inch and a drill guide G to be utilized therewith is provided with a length approximating one-half inch. The drill guide G normally is comprised of a heat hardenable steel alloy but may alternately be comprised of any metallic composition suitable for the purpose. An axially centered drill-hole opening 12 is provided therein. In this specific embodiment, and for the purpose of example only, the drill guide G is shown as being substantially tubular in shape with approximately a 3/16 inch tubular wall, the upper outer half area thereof being slightly thicker than the lower half area 11 and being provided with a knurled surface 10, as above disclosed, to facilitate the securing of the drill guide in the template. Other shapes and configurations of drill guide than that shown in the drawing may be used without departing from the invention.

In accordance with the present invention, the drill guide G is first embedded in a bushing B, preferably by securing the same in an axially centered opening 13 therein, the bushing B comprised of material having a thermal conductivity, mass and heat radiation and heat storage properties adapted to maintain a temperature $t_1$ over the outer periphery of the drill guide G that is substantially below the thermal decomposition temperature of the material comprising the bushing B and a temperature $t_2$ about the periphery of the bushing B that is substantially below the thermal decomposition temperature of the template and of the cementing or potting compound employed in securing the bushing in the template, which latter temperature, as above noted, is in this specific embodiment pre-set by the epoxy compounds used in forming the template T at approximately 200° F.

For the light drilling conditions specified, it has been found that a bushing B comprised of a thermo-setting resin of the types know in the art as phenolic, polyester, diaylphthalate, and epoxy resins having a diameter approximately one inch and a thickness approximately one-half inch, gives satisfactory results. These types of resin have a low thermal conductivity and a thermal decomposition temperature within the range 200°–500°.

As one specific example, the bushing B comprised of a diaylphthalate composition having a thermal decomposition temperature within the range 200°–500° F. is first pressure and heat molded to size with the drill guide G centered therein. In mounting this drill guide bushing B in position in the slightly over-sized opening provided therefor in the template T, a cementing or potting composition consisting of epoxy compounds similar in composition to those comprising the laminated template T is preferably employed.

With this type of bushing B comprised of thermosetting resin of selected composition, the thermal conductivity of the bushing is too low for medium and heavy drilling conditions and the thermal conductivity of the bushing may be increased by incorporating therein a plurality of different types of filler materials, such as thermally conductive metal powders, fibers, or filaments, in such amounts and relative proportions as will be effective in increasing the rate of heat transfer from the drill guide to the interior of the bushing. For added strength in the bushing B thermally non-conducting fibers, such as glass wool also may be incorporated in the bushing B without departure from the invention.

With this type of bushing it has been determined experimentally and in service use, that the service life of the drill guide G in the template T under the light drilling conditions specified is increased from 3 to 10 times that of the drill guide as previously mounted in the template, depending upon the extent to which optimum drilling conditions are maintained.

Figure 6A:
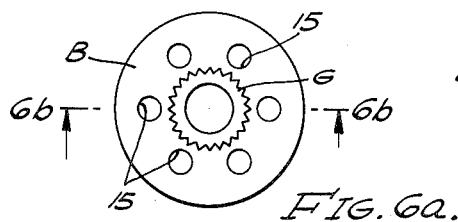
FIG. 6a is a top view of a second specific embodiment of the present invention.
Figure 6B:
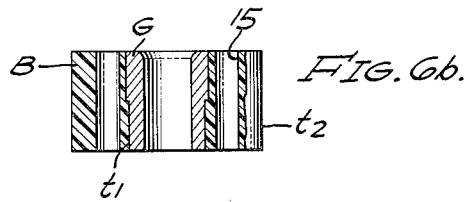

Referring now to FIGS. 6a and 6b where conditions of higher heat generation in the drilling operation, such as medium drilling operations are to be met by the bushing, it has been found that the heat radiating properties of the bushing B may be increased by increasing the heat radiating surface thereof such as by providing a plurality of heat radiating openings 15 in the body of the bushing B. The heat radiating openings preferably are concentrically spaced about and axially parallel to the drill guide G substantially as shown in the drawings. The size, shape, and number of these heat radiating openings may be varied widely without essential departure from the invention as well as the precise concentric relation of these openings with respect to the drill guide G and the outer peripheral surface of the bushing B.

In most instances, under any given conditions of heat generation at drill guide G and any determined rate of heat conductivity in bushing B, the provision of the heat radiating openings 15 therein materially increases the rate of heat loss from the bushing. This increase in heat loss insures against the temperature limitations $t_1$ and $t_2$ being exceeded where the drilling conditions, per se, are close to the critical point and obviates the need of either a larger bushing B or a revision in bushing composition to obtain increased thermal conductivity therein.

Figure 7A:
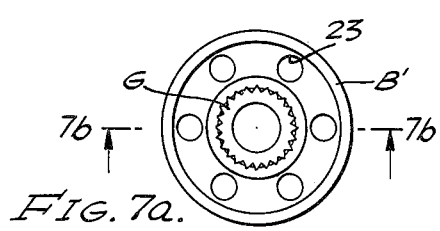
FIG. 7a is a top view of a third specific embodiment of the present invention.
Figure 7B:
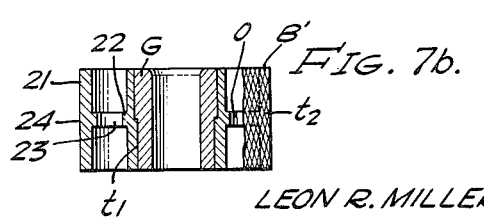

Referring now to FIGS. 7a and 7b, the specific embodiment shown is one designed for the heat conditions encountered in heavy drilling operations. The term "heavy drilling" covers a wide range of conditions, in all of which the generation of heat during the drilling operation is excessive due to one cause or the other. In this type of drilling operation, in addition to the temperatures $t_1$ and $t_2$, a third temperature limitation is involved. This third temperature limitation is provided by the drill guide itself. Being comprised in this specific embodiment of a heat hardened alloy, the drill guide G retains this hardness so long as the temperature of the drill guide does not exceed the annealing temperature. While the rate at which the hardness of the drill guide decreases is a function of the time and temperature, repeated heatings to a temperature within the range at which this time-temperature annealing reaction occurs gradually softens the drill guide, particularly at the surface in contact with the drill with the result that the drill guide often must be replaced even though the main body of the bushing B is intact.

To meet this drilling condition, the bushing B is comprised, preferably, of a metallic composition of substantially the same size as bushing B, the composition of the metal or its physical size, shape, configuration, or physical condition being selected to provide a relatively rapid rate of heat transfer from the drill guide into the bushing to maintain the temperature in the drill guide substantially below the annealing temperature $t_3$, but whose rate of heat loss is such that the mass of the bushing, particularly about the periphery, is maintained at a temperature substantially below $t_2$.

This result is obtained in the bushing $B^1$ by comprising the bushing of a ferrous alloy, such as machine steel and shaping the bushing $B^1$ such as to provide a center tubular hub 20 within which the drill guide G is press-fitted, and an outer annular rim 21, secured in concentric spaced relation to the hub 20 by a web 22, through which web 22 extends a plurality of concentrically aligned and spaced port hole openings 23. In this type of structure for bushing B, the large increase in heat radiating surface provided by the inner annular surfaces of the rim and hub, and by the web sections of the bushing with the port hole openings 23 therein, cooperate to control the rate of heat transfer from the hub 20 to the peripheral outer surface 24 of the bushing $B^1$. The web 23 moreover functions in part as a thermal barrier, the effectiveness thereof varying with its thickness and length and with the number of port hole openings 23 provided therein. In place of round openings 23, substantially any other type of opening may be employed therein without departure from the invention, such as oval, curved ovate, winged, diamond-shaped, etc.

The exterior surface 24 of the bearing $B^1$ is preferably roughened or knurled to provide additional bonding surface on the periphery of the bushing when bonded in mounted position in the oversized opening provided therefor in the template T.

Figure 8:
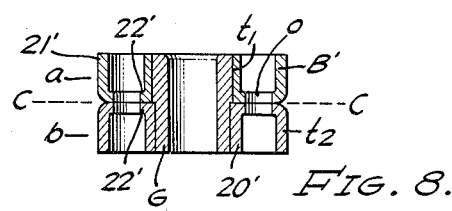
FIG. 8 is a sectional view illustrating a second form of the specific embodiment shown in FIGS. 7a and 7b.

An alternate form of bushing $B^1$ conforming to that of FIG. 7 (a and b) is that shown in FIG. 8, wherein the bushing $B^1$ is comprised of two parts (a and b) split along the partition line c—c, each part a and b being substantially identical in size, shape and configuration and being secured together as a unitary body substantially identical to the modification of FIG. 7 (a and b) by the drill guide G press-fitted therein in the hub 20′. Parts a and b are comprised of sheet metal, preferably sheet steel, stamped into the configuration shown and in its functional design approximates the bushing $B^1$ of FIG. 7.

Having herein disclosed the present invention generically and specifically and having given four specific embodiments thereof, it is believed apparent that the invention may be widely varied without essential departure therefrom and all such modifications, departures and improvements thereof are contemplated as may fall within the scope of the following claims:

We claim:

1. An article of manufacture comprising a drill guide mounted in a bushing, the said bushing being secured in a drilling template by a potting or cementing compound, said drill guide comprising a tubular member formed of material having a relatively high rate of heat conductivity, said bushing being comprised of material having a relatively lower rate of heat conductivity, the said bushing having a higher decomposition temperature than the material of the template or the cementing or potting compound and the bushing having sufficient heat conductivity to be able to disperse and radiate the heat generated by friction to prevent the temperature of the template material or the potting or cementing compound to rise to their decomposition or physical degradation points.

2. The article of manufacture as in claim 1 wherein the body part of the said bushing is provided with a plurality of heat radiating openings therein to increase the heat radiating surface of the bushing.

3. The article of manufacture as in claim 1 wherein the material of the bushing comprises a synthetic thermo-setting resin.

4. The article of manufacture as in claim 1 wherein the bushing comprises a synthetic thermo-setting resin impregnated with a material of relatively higher heat conductivity in an amount imparting a desired rate of thermal conductivity to the resin.

5. The article of manufacture as in claim 1, said bushing being comprised of a synthetic thermo-setting resin having a selected amount of a material of relatively high thermal conductivity, admixed therein to impart a desired determined rate of thermal conductivity to the bushing interior and wherein the body of said bushing is provided with a plurality of heat radiating openings therein.

6. The article of manufacture of claim 1, said bushing comprising a metallic composition wherein the body part of said bushing intermediate a hub portion within which the drill guide is mounted and a rim portion concentrically spaced thereto is cut away to provide a relatively large surface area for heat radiation from the bushing and web area of relatively small thickness connecting the hub and rim.

References Cited in the file of this patent

UNITED STATES PATENTS

| | | |
|---|---|---|
| 1,808,047 | Littleton et al. | June 2, 1931 |
| 2,392,804 | Basolo | Jan. 15, 1946 |
| 2,698,547 | Armacost | Jan. 4, 1955 |
| 2,728,249 | Stein et al. | Dec. 27, 1955 |